(12) United States Patent
Dotson et al.

(10) Patent No.: US 12,328,080 B2
(45) Date of Patent: Jun. 10, 2025

(54) BOOST CONVERTER STATE CONTROL

(71) Applicant: Carrier Corporation, Palm Beach Gardens, FL (US)

(72) Inventors: Thomas Dotson, Syracuse, NY (US); Ismail Agirman, Southington, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 238 days.

(21) Appl. No.: 17/962,004

(22) Filed: Oct. 7, 2022

(65) Prior Publication Data
US 2023/0134793 A1 May 4, 2023

Related U.S. Application Data

(60) Provisional application No. 63/272,746, filed on Oct. 28, 2021.

(51) Int. Cl.
H02M 7/53 (2006.01)
H02M 7/5395 (2006.01)

(52) U.S. Cl.
CPC ................. H02M 7/5395 (2013.01)

(58) Field of Classification Search
CPC .................................. H02M 7/5395
See application file for complete search history.

(56) References Cited

U.S. PATENT DOCUMENTS 5,414,613 A 5/1995 Chen
6,115,274 A 9/2000 Mao
8,080,973 B2 12/2011 King et al.
9,742,267 B2 8/2017 Arisawa et al.
9,929,636 B2 3/2018 Shinomoto et al.
9,931,944 B2 4/2018 Alam et al.
9,960,687 B2 5/2018 Elasser et al.
(Continued)

FOREIGN PATENT DOCUMENTS

EP 2922192 A1 9/2015
EP 3769984 A1 1/2021

OTHER PUBLICATIONS

Extended European Search Report; European Application No. 22200848.4; dated Mar. 7, 2023; 8 pages.
(Continued)

Primary Examiner — Rafael O De Leon Domenech
(74) Attorney, Agent, or Firm — CANTOR COLBURN LLP

(57) ABSTRACT

Provided are embodiments for a system and method for controlling a boost control circuit. Embodiments include a power supply and a boost converter circuit coupled to the power supply, wherein the boost converter circuit is operable to provide power to the load. Embodiments also include a 3-phase inverter coupled to the boost converter, wherein the 3-phase-inverter is operable to provide a 3-phase output, and a controller coupled to the boost converter and the 3-phase inverter. The controller can be configured to receive a voltage level of a power supply and a voltage level of a 3-phase inverter; compare a power threshold to at least one of: the voltage level of the power supply and the voltage level of the 3-phase inverter; and control an operation of the boost converter circuit to operate in a boost mode or a rectification mode based at least in part on the comparison.

15 Claims, 3 Drawing Sheets

(56) References Cited

U.S. PATENT DOCUMENTS

| | | |
|---|---|---|
| 10,148,212 B2 | 12/2018 | Schumacher et al. |
| 10,239,407 B2 | 3/2019 | Yu et al. |
| 10,291,159 B2 * | 5/2019 | Hasegawa ................ H02H 7/06 |
| 10,348,221 B1 | 7/2019 | Wolfe et al. |
| 10,381,967 B2 | 8/2019 | Lee et al. |
| 10,744,898 B2 | 8/2020 | Yang et al. |
| 10,771,001 B2 | 9/2020 | Smolenaers |
| 10,821,843 B2 | 11/2020 | Slepchenkov et al. |
| 10,840,807 B2 | 11/2020 | Schumacher et al. |
| 10,870,333 B2 | 12/2020 | Schumcher et al. |
| 10,926,610 B2 | 2/2021 | Schumacher et al. |
| 11,211,872 B1 * | 12/2021 | Jang ................... H02M 1/4225 |
| 2014/0265945 A1 | 9/2014 | Deboy |
| 2018/0212545 A1 | 7/2018 | Xu et al. |
| 2020/0247218 A1 | 8/2020 | Zheng et al. |
| 2021/0070138 A1 | 3/2021 | Schumacher et al. |
| 2021/0213805 A1 | 7/2021 | Saroka et al. |
| 2021/0213806 A1 | 7/2021 | Saroka et al. |
| 2021/0260964 A1 | 8/2021 | Saroka et al. |

OTHER PUBLICATIONS

Kiran, Ravi S. et al., "Voltage Control of Variable Speed SEIG with Z-Source Inverter", Industrial Electronics and Application (ICIEA), 2012 7th IEEE Conference on, IEEE, Jul. 18, 2012, pp. 844-849, XP032268507, ISBN: 978-1-4577-2118-2; 6 pages.

* cited by examiner

BOOST CONVERTER STATE CONTROL

CROSS-REFERENCE TO RELATED APPLICATIONS

This application claims the benefit of U.S. Provisional Application No. 63/272,746 filed Oct. 28, 2021, the disclosure of which is incorporated herein by reference in its entirety.

BACKGROUND

The present disclosure relates to converters, and more specifically, to a system and a method for boost converter state control.

Converters can be used to condition the power for various applications that may have different power requirements from the source. Therefore, there may be a need to increase the voltage supplied from a source using a boost converter or decrease the voltage using a buck converter. In addition, various types of converters can be used to modify direct current (DC) to alternating current (AC) and vice-versa, which depends on the various applications using the power. Electric transport refrigeration units often rely on converters to drive the load such as the compressors that are used to cool the cargo. There may be a need to provide a converter that efficiently interfaces with the compressor.

BRIEF DESCRIPTION

According to an embodiment, a system for controlling a boost control circuit is provided. The system can include a power supply operable to supply power to a load; a boost converter circuit coupled to the power supply, wherein the boost converter circuit is operable to provide power to the load; a 3-phase inverter coupled to the boost converter, wherein the 3-phase-inverter is operable to provide a 3-phase output; and a controller coupled to the boost converter and the 3-phase inverter. The controller can be configured to receive a voltage level of a power supply and a voltage level of a 3-phase inverter; compare a power threshold to at least one of: the voltage level of the power supply and the voltage level of the 3-phase inverter; and control an operation of the boost converter circuit to operate in a boost mode or a rectification mode based at least in part on the comparison.

In addition to one or more of the features described herein, or as an alternative, further embodiments include a controller that is further configured to operate the boost converter circuit in the boost mode when the voltage level of the power supply or the voltage level of the 3-phase inverter is greater than the power threshold.

In addition to one or more of the features described herein, or as an alternative, further embodiments include a controller that is further configured to operate the boost converter circuit in the rectification mode when the voltage level of the power supply or the voltage level of the 3-phase inverter is less than the power threshold.

In addition to one or more of the features described herein, or as an alternative, further embodiments include a controller that is configured to compare the voltage level of the power supply to the voltage of the 3-phase inverter or a voltage level of the load.

In addition to one or more of the features described herein, or as an alternative, further embodiments include a controller that is configured to operate the boost converter circuit in the boost mode when the voltage level of the power supply is less than the voltage level of the 3-phase inverter or the voltage level of the load.

In addition to one or more of the features described herein, or as an alternative, further embodiments include a controller that is configured to operate the boost converter circuit in the rectification mode when the voltage level of the power supply is greater than the voltage level of the 3-phase inverter or the voltage level of the load.

In addition to one or more of the features described herein, or as an alternative, further embodiments include a transformation module that is configured to transform an output of the 3-phase inverter to a synchronous frame voltage level.

In addition to one or more of the features described herein, or as an alternative, further embodiments include a transformation module that performs an ABC-to-dq conversion.

In addition to one or more of the features described herein, or as an alternative, further embodiments include a direct current (DC) power supply.

According to an embodiment, a method for controlling a boost converter circuit is provided. The method includes receiving, at a controller, a voltage level of a power supply and a voltage level of a 3-phase inverter; comparing a power threshold to at least one of: the voltage level of the power supply and the voltage level of the 3-phase inverter; and controlling an operation of the boost converter circuit to operate in a boost mode or a rectification mode based at least in part on the comparison.

In addition to one or more of the features described herein, or as an alternative, further embodiments include operating the boost converter circuit in the boost mode when the voltage level of the power supply or the voltage level of the 3-phase inverter is greater than the power threshold.

In addition to one or more of the features described herein, or as an alternative, further embodiments include operating the boost converter circuit in the rectification mode when power of the voltage level of the power supply or the voltage level of the 3-phase inverter is less than the power threshold.

In addition to one or more of the features described herein, or as an alternative, further embodiments include comparing the voltage level of the power supply to the voltage level of the 3-phase inverter or a voltage level of a load.

In addition to one or more of the features described herein, or as an alternative, further embodiments include operating the boost converter circuit in the boost mode when the voltage level of the power supply is less than at least one of: the voltage level of the 3-phase inverter and the voltage level of the load.

In addition to one or more of the features described herein, or as an alternative, further embodiments include operating the boost converter circuit in the rectification mode when the voltage level of the power supply is greater than at least one of: the voltage level of the 3-phase inverter and the voltage level of the load.

In addition to one or more of the features described herein, or as an alternative, further embodiments include transforming an output of the 3-phase inverter to a synchronous frame voltage level.

In addition to one or more of the features described herein, or as an alternative, further embodiments include a transformation that is an ABC-to-dq conversion.

In addition to one or more of the features described herein, or as an alternative, further embodiments include a direct current (DC) power supply.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Converters are often used to condition power for various loads. Due to the high-ripple currents of the electric transport refrigeration unit (eTRU), there is a high probability of the peak current being greater than the DC current of the boost converter. In this event, the boost converter will enter the discontinuous mode (DCM). In DCM, the inductor current of the boost converter 102, such as that shown in FIG. 1, can fall to zero which is very common in DC-to-DC converters and makes the DC voltage at the DC link capacitor uncontrollable. One or more embodiments of the techniques described herein prevents the converter from entering DCM by controlling the low-side insulated-gate bipolar transistor (IGBT) of the boost converter to operate the boost converter in the boost mode and further increases the efficiency by operating the converter in a rectification mode (non-boosting mode) during periods of low demand from the load.

In the event the motor, such as a compressor motor, presents a higher load to an inverter coupled to the boost converter, the boost converter will respond by enabling the boost mode operation of the circuit with a low-side IGBT and a high-side Schottky diode.

In one or more embodiments of the disclosure, the switch is controlled based on a comparison of the abc-dq conversion. The comparison prevents the system from entering the DCM. The techniques described herein prevent the converter from entering DCM by the gate driver signals to the low-side IGBTs.

Figure 1:
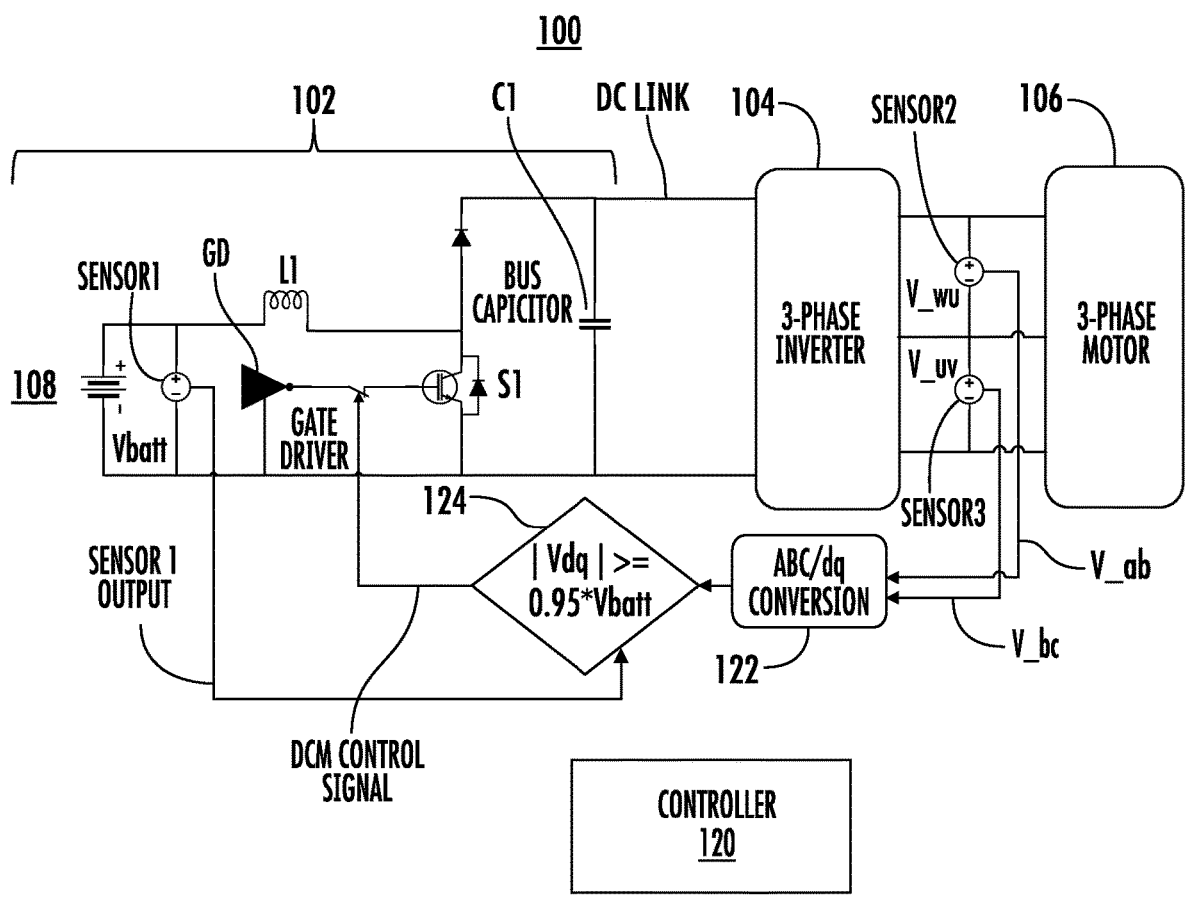
FIG. 1 illustrates an example system in accordance with one or more embodiments of the disclosure.

In the embodiment shown in FIG. 1, a system 100 includes a boost converter 102, a 3-phase inverter 104, and a 3-phase motor or load 106. In one or more embodiments of the disclosure, the boost converter 102 includes the power supply 108, the inductor L1, the diode D1, the gate drive GD, the switch S1, and the DC link capacitor C1. The power supply 108 is electrically coupled to the inductor L1 and increases the voltage of the inductor L1 when the switch S1 is closed. The gate driver GD is coupled to the control terminal of the switch S1 which is under the control of a control signal of a controller 120.

When the switch S1 is opened, the current from the inductor L1 is allowed to flow through the diode D1 and to the DC link and DC link capacitor C1. As the voltage is provided from the inductor L1, its magnetic field decreases and the inductor L1 will be periodically charged when the switch S1 is closed by the controller 120. The normal operation of the boost converter 102 allows the inductor L1 to boost the voltage when the demand of the load 106 is increased. In one or more embodiments of the disclosure, the controller 120 may enter the boost mode of operation based on the power level of the power supply 108. For example, thresholds for various voltage levels and power levels can be used to determine when the system 100 should enter the boost mode or rectification mode of operation. However, if there is not enough voltage provided from the boost converter 102, the operation of the 3-phase inverter can be interrupted when the demand from the load 106 exceeds the capability of the power supply 108. In one or more embodiments, the power supply 108 is a DC source such as a battery. The power supply 108 may be another type of DC source. When the load 106 requires a low power demand, the boost converter 102 can operate in a rectification mode to rectify the power from the power supply 108 to provide the required voltage for the load 106. In such a mode, the switch S2 is controlled open to prevent the boost operation of the boost converter 102.

A first voltage sensor ("Sensor1") is electrically coupled in parallel with the power supply 108 and detects the voltage that is output from the power supply 108. The "Sensor1 Output" from Sensor1, represents the voltage level of the power supply voltage level, is provided to the controller 120. A second voltage sensor ("Sensor2") and a third voltage ("Sensor3") are electrically coupled in parallel to the AB phases and the BC phases that are output of the 3-phase inverter 104, respectively. Sensor2 and Sensor 3 provide the voltage levels V_AB and V_BC to the controller 120. In one or more embodiments of the disclosure, the voltage levels V_AB and V_BC of the 3-phase inverter 104 are provided to an ABC/dq transformation module 122. In one or more embodiments of the disclosure, the ABC/dq transformation module 122 can be incorporated in the controller 120. As an example, the DQ transform is used to simplify the analysis of 3-phase synchronous machines or to simplify calculations for the control of 3-phase inverters. In the analysis of 3-phase synchronous machines, the transformation transfers 3-phase stator and rotor quantities into a single rotating reference frame to eliminate the effect of time-varying inductances and transform the system into a linear time-invariant system. It should be understood the transformation can be performed in the controller 120 and can be executed in either hardware, software, or any combination thereof. By transforming the 3-phase inverter output to the dq-frame, the controller 120 can compare the voltage levels at the 3-phase inverter output and the power supply 108.

A comparator 124 receives the output from the ABC/dq transformation module 122 and compares the voltage level of the power supply 108 indicated by the Sensor1 Output. In one or more embodiments of the disclosure, the comparator 124 can be performed in the controller 120. In some embodiments, the comparator 124 can compare the absolute value of the voltage (Vdq) with a threshold voltage of the power supply 108. For example, the absolute value of the voltage |Vdq| is compared to threshold voltage 95% of the power supply voltage (0.95*power supply voltage). In the event |Vdq| is equal to or exceeds 95%, the DCM switch S2 is closed to allow the inductor L1 to charge. The DCM control signal can be transmitted from the controller 120 to control the DCM switch S2. The DCM control signal can open and close the switch S2 to operate the boost converter 102 in a rectification mode (non-boosting mode) and a boost mode to increase the voltage to meet the demand of the load 106. In a non-limiting embodiment, the boost converter 102 can be operated in the rectification mode (non-boosting mode) when the DCM switch S2 is controlled to remain open, and the boost converter 102 can be operated in the boost mode when the DCM switch S2 is closed. During the boost mode the switch S1 can be switched according to the PWM signals provided from the controller 120 and is operable to increase or step-up the input voltage to a desired level when are operated in the boost mode.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 2:
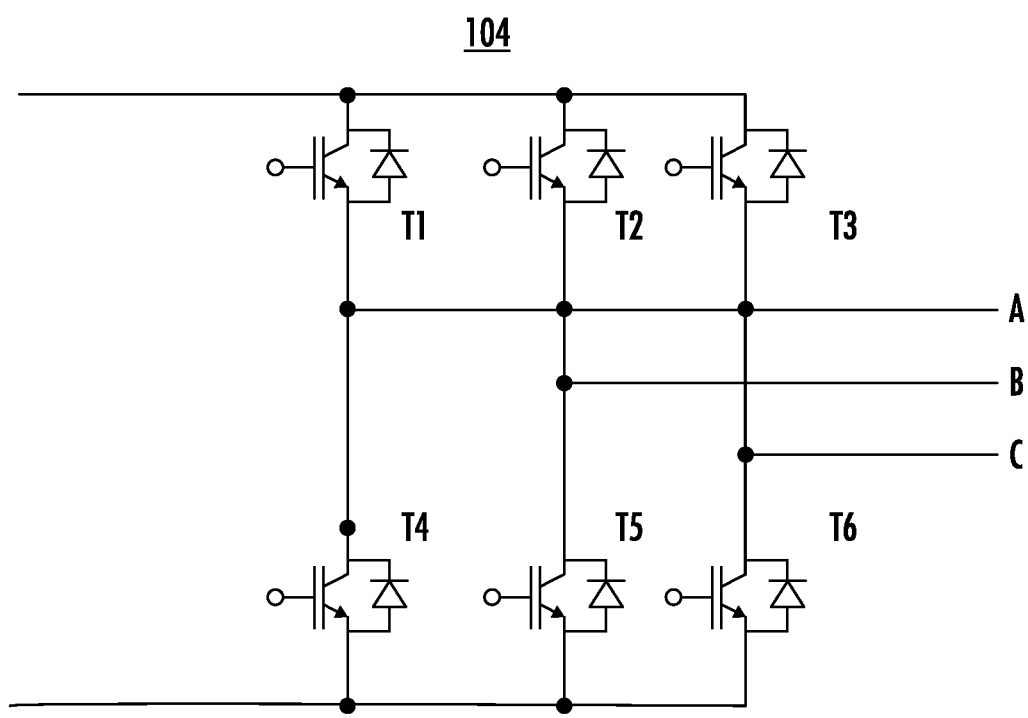
FIG. 2 illustrates an example 3-phase inverter use in the system of FIG. 1 in accordance with one or more embodiments of the disclosure.

FIG. 2 illustrates a non-limiting example of the 3-phase inverter 104 shown in FIG. 1. The 3-phase inverter 104 includes 3 pairs of transistors (T1, T4), (T2, T5), (T3, T6), where each pair of transistors are operated in a complementary fashion to generate a corresponding 3-phase output (A, B, C), respectively. The transistors T1-T6 may be implemented as metal-oxide semiconductor devices or other controllable devices such as bipolar junction transistors (BJT) devices, IGBT devices, or the like. Each of the control terminals of the transistors T1-T6 are electrically coupled to the controller 120. The arrangement of the 3-phase inverter can be operated using known techniques such as pulse-width modulation (PWM). It should be understood that other arrangement can be used to generate the 3-phase output.

Figure 3:
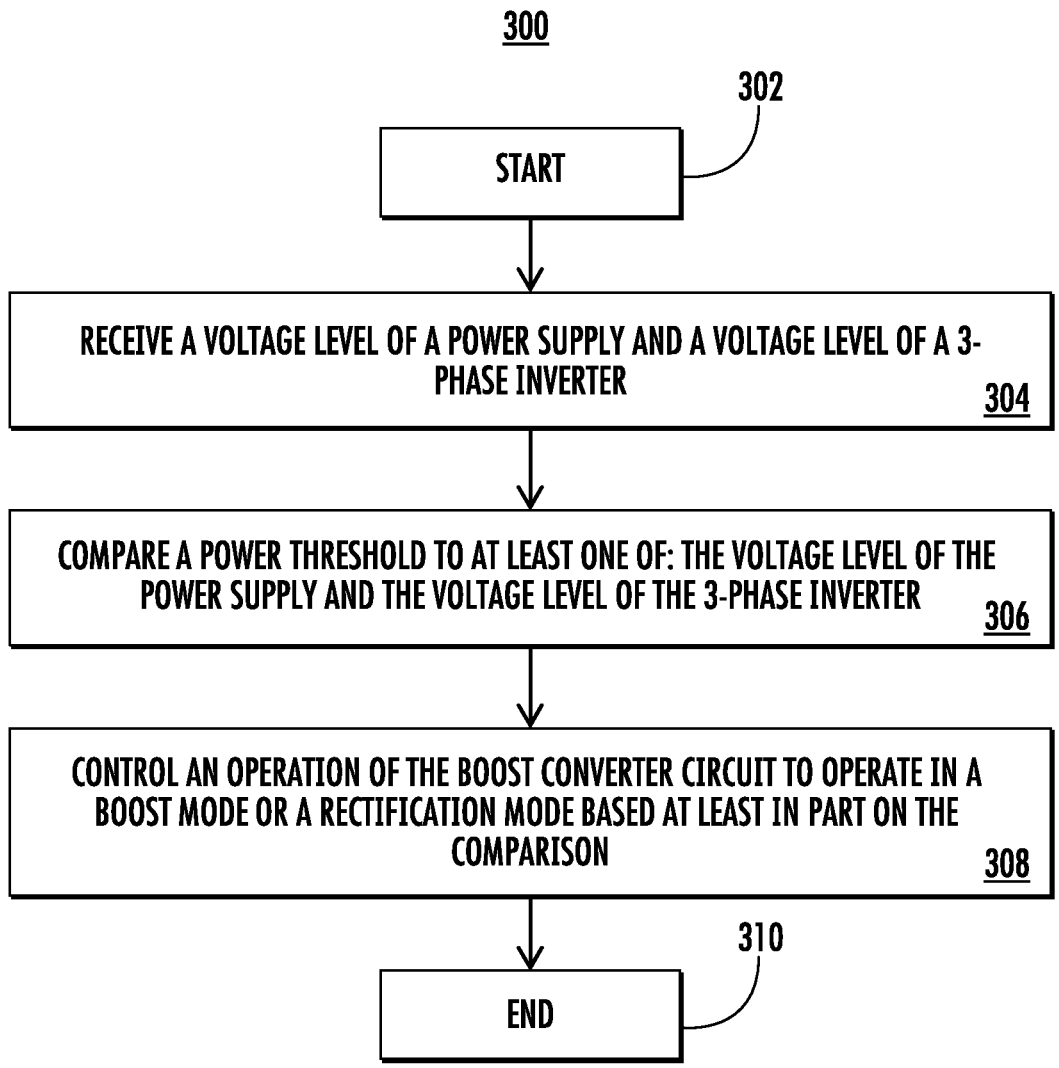
FIG. 3 illustrates a flowchart depicting an exemplary method for operating the boost converter to prevent the discontinuous mode (DCM) in accordance with one or more embodiments of the disclosure.

FIG. 3 depicts a flowchart of a method 300 for controlling the boost converter 102 in accordance with one or more embodiments of the disclosure. The method 300 can be implemented in a system 100 such as that shown in FIG. 1. The method 300 starts at block 302 and proceeds to block 304 which provides for receiving, at a controller, a voltage level of a power supply and a voltage level of a 3-phase inverter. During the operation of the boost converter 102, the controller 120 can monitor and receive the output voltage levels corresponding to the DC battery source and the output of the 3-phase inverter. It can be appreciated the controller 120 can also receive other information from current sensors and/or voltage sensors arranged in the system 100. Additionally, the controller 120 can determine the power from the voltage and current information obtained from the sensors coupled to the power supply, 3-phase inverter, load, etc. In one or more embodiments of the disclosure, the boost operation of the boost converter 102 can be implemented based on exceeding a power threshold or a comparison between the output level and a percentage of the power supply. In such a scenario, the voltage of the load or the motor approaches the rectified voltage of the boost converter 102 when operated in a rectification mode (non-boosting mode). In a different scenario, when the load voltage at the output increases above a voltage threshold, the boost converter switches from the rectification mode to the boost mode, to supply the voltage that is demanded by the load. By implementing various thresholds to detect the voltage levels and power levels, the stable operation of the boost converter 102 is enabled to avoid the DCM that is responsive to the detected conditions.

Block 306 compares a power threshold to at least one of: the voltage level of the power supply and the voltage level of the 3-phase inverter. In some embodiments, a threshold level that is 95% of power supply level can be used. The threshold can include a higher threshold such as 96%, 97%, etc. or a lower threshold such as 94%, 93%, etc. It should be understood the threshold is not intended to be limited by any of the examples described herein but can be any configurable to any value based upon the application. The 3-phase output of the 3-phase inverter is transformed to the dq-frame of reference. The transformation allows the controller 120 to compare the transformed 3-phase output to the DC voltage of the power supply 108. In one or more embodiments of the disclosure, the controller 120 can determine whether the output of the 3-phase inverter exceeds the threshold voltage of the power supply 108 or is below the threshold voltage.

Block 308 controls an operation of the boost converter circuit to operate in a boost mode or a rectification mode based at least in part on the comparison. In one or more embodiments of the disclosure, when the voltage of the power supply or the voltage of the 3-phase inverter is greater than the power threshold, the controller is configured to operate the boost converter circuit in the boost mode. The controller 120 provides a control signal to the lo-side DCM switch to close the switch to enable the boost mode of the boost converter 102 to increase the voltage provided to the 3-phase inverter 104 and load 106. By controlling the switch to operate in the boost mode upon the detection of the increased power demand, the boost converter 102 is prevented from entering DCM. When the power of the power supply or the 3-phase inverter is less than the power threshold, the controller is configured to operate the boost converter circuit in the rectification mode. In the rectification mode, the controller holds the DCM switch open to prevent the PWM signals from entering the boost mode.

In one or more embodiments of the disclosure, the comparison further comprises comparing the voltage level of the power supply to at least one of: the voltage of the 3-phase inverter and a voltage level of a load. When the voltage level of the power supply is less than at least one of: the voltage level of the 3-phase inverter and the voltage level of the load, the controller 120 is configured to operate the boost converter in the boost mode. When the voltage level of the power supply is greater than at least one of: the voltage level of the 3-phase inverter and the voltage level of the load, the controller is configured to operate the boost converter in the rectification mode.

The method 300 ends at block 310. It should be understood that additional steps or a different sequence of steps can be included in various embodiments of the disclosure and is not intended to be limited by the steps shown in FIG. 3.

The technical effects and benefits include reducing losses from the battery-DC bus power electronics interface. In addition, the stability of the eTRU inverter is improved at low loads and the overall efficiency is improved by operating the boost converter in the rectification mode and the boost mode. The technical effects and benefits include being operable with variable-speed operation.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for controlling a boost control circuit, the system comprising:
    a DC power supply;
    a boost converter circuit coupled to the DC power supply;
    a 3-phase inverter coupled to the boost converter circuit, wherein the 3-phase-inverter is operable to provide a 3-phase AC output to the load;
    a controller coupled to the boost converter circuit and the 3-phase inverter, wherein the controller is further configured to:
        receive a voltage level of a DC power supply and a voltage level of a 3-phase inverter;
        compare a threshold voltage of the voltage level of the DC power supply to the voltage level of the 3-phase inverter; and
        control an operation of the boost converter circuit to operate in a boost mode or a rectification mode based at least in part on the comparison.

2. The system of claim 1, wherein the controller is further configured to operate the boost converter circuit in the boost mode when the threshold voltage of the voltage level of the DC power supply is less than the voltage level of the 3-phase inverter.

3. The system of claim 1, wherein the controller is further configured to operate the boost converter circuit in the rectification mode when the threshold voltage of the voltage level of the DC power supply is greater than the voltage level of the 3-phase inverter.

4. The system of claim 1, further comprising a transformation module configured to transform an output of the 3-phase inverter to a synchronous frame voltage level.

5. The system of claim 4, wherein the transformation module performs an ABC-to-dq conversion.

6. The system of claim 1, wherein the threshold voltage of the voltage level of the DC power supply is 93% to 97% of the voltage level of the DC power supply.

7. The system of claim 1, wherein the threshold voltage of the voltage level of the DC power supply is 95% of the voltage level of the DC power supply.

8. The system of claim 1, further comprising:
    a first voltage sensor connected across a first phase of the 3-phase inverter and a second phase of the 3-phase inverter; and
    a second voltage sensor connected across the second phase of the 3-phase inverter and a third phase of the 3-phase inverter;
    the first voltage sensor and the second voltage sensor configured to sense the voltage level of the 3-phase inverter.

9. A method for controlling a boost converter circuit, the method comprising:
    receiving, at a controller, a voltage level of a DC power supply and a voltage level of a 3-phase inverter configured to provide a 3-phase AC output to a load;
    comparing a threshold voltage of the voltage level of the DC power supply to the voltage level of the 3-phase inverter; and
    controlling an operation of the boost converter circuit to operate in a boost mode or a rectification mode based at least in part on the comparison.

10. The method of claim 9, wherein when the threshold voltage of the voltage level of the DC power supply is less than the voltage level of the 3-phase inverter, the boost converter circuit is operated in the boost mode.

11. The method of claim 9, wherein when the threshold voltage of the voltage level of the DC power supply is greater than the voltage level of the 3-phase inverter and, the boost converter circuit is operated in the rectification mode.

12. The method of claim 9, further comprising transforming an output of the 3-phase inverter to a synchronous frame voltage level.

13. The method of claim 12, wherein the transformation is an ABC-to-dq conversion.

14. The method of claim 9, wherein the threshold voltage of the voltage level of the power supply is 93% to 97% of the voltage level of the power supply.

15. The method of claim 9, wherein the threshold voltage of the voltage level of the DC power supply is 95% of the voltage level of the DC power supply.

* * * * *